Figure 1:
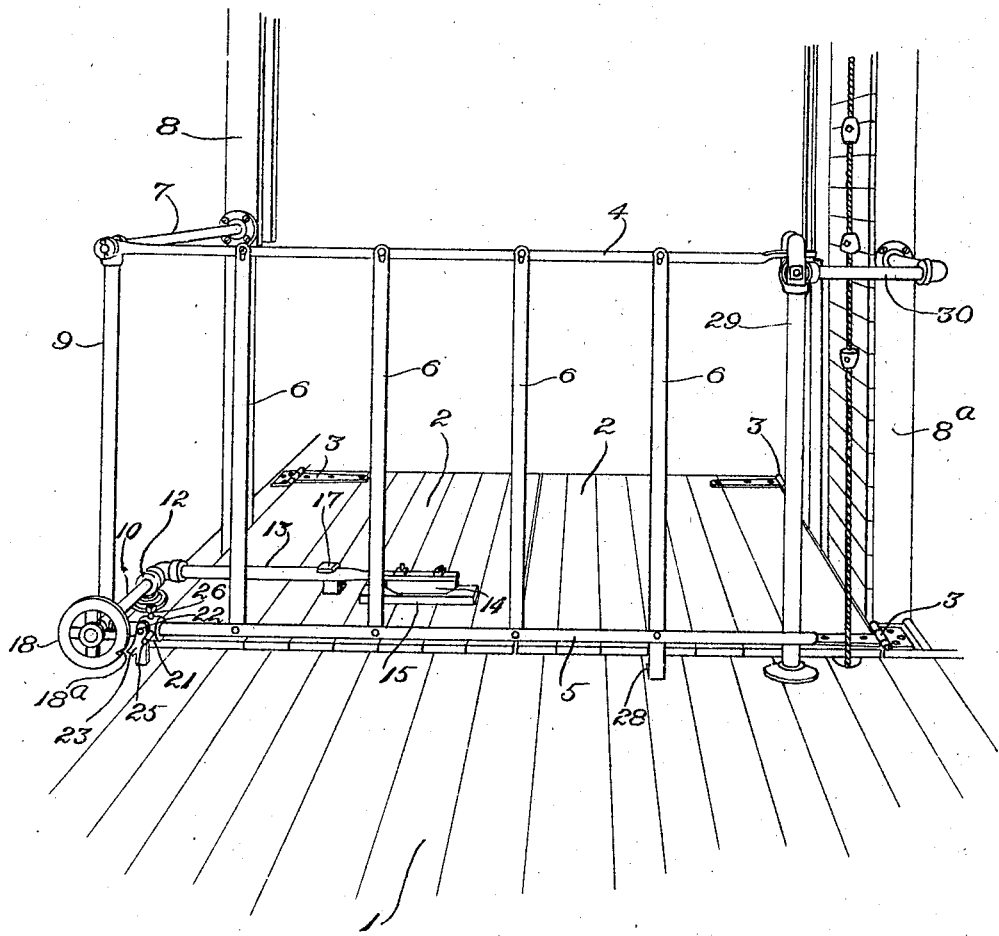

Dec. 4, 1923.  
M. F. KEVLIN  
ELEVATOR HATCHWAY GATE  
Filed Nov. 19, 1920

1,476,449

2 Sheets-Sheet 1

Witness:
Oscar F. Hill

Inventor:
Mathew F. Kevlin
by Chas. F. Randall
Attorney.

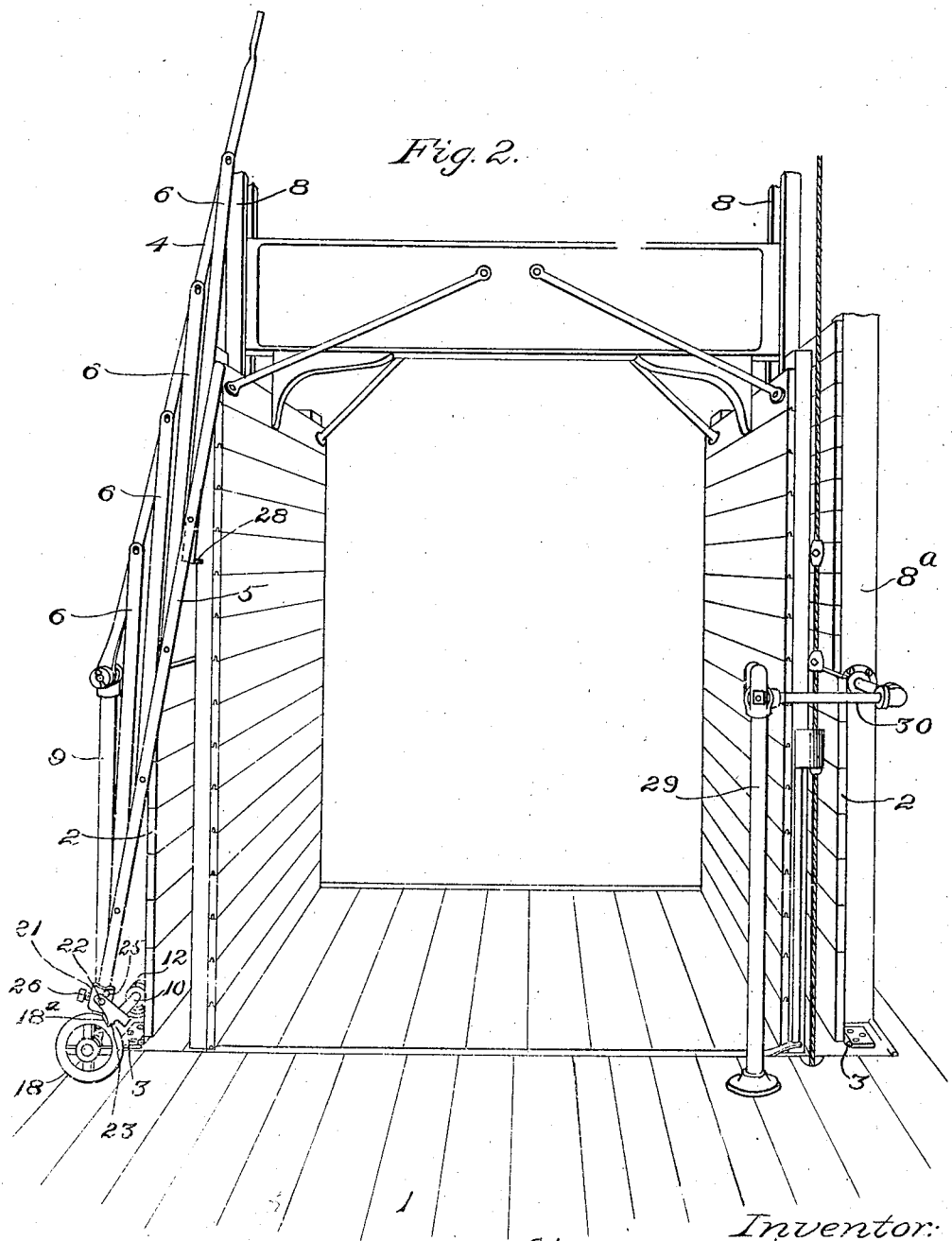

Patented Dec. 4, 1923.

1,476,449

UNITED STATES PATENT OFFICE.

MATHEW F. KEVLIN, OF SPRINGFIELD, VERMONT.

ELEVATOR-HATCHWAY GATE.

Application filed November 19, 1920. Serial No. 425,168.

*To all whom it may concern:*

Be it known that I, MATHEW F. KEVLIN, a citizen of the United States, residing at Springfield, in the county of Windsor, State of Vermont, have invented a certain new and useful Improvement in Elevator-Hatchway Gates, of which the following is a specification, reference being had therein to the accompanying drawings.

The invention relates to the controlling and operating mechanisms of the vertically-movable gates which are employed as guards in connection with the hatchways of elevators, for instance.

The invention, firstly, consists in semi-automatic hatchway-gate mechanism so contrived and combined that the gate will not be raised automatically as the car passes, but will be left to be raised by hand, the said mechanism including means whereby the gate, after having been raised, is locked in raised position while the car remains at the hatchway alongside which the gate is applied, the mechanism further being contrived to operate so that movement of the car away from the hatchway, either up or down, is accompanied by automatic closing of the gate into position to serve as a guard.

The invention consists, further, in hatchway-gate mechanism which is convertible at will from semi-automaticity, as just explained, to complete automaticity, and vice versa.

The drawings show one embodiment of the invention in preferred form.

Fig. 1 of the drawings is a perspective view showing the said embodiment, with the hatchway-doors and gate closed.

Fig. 2 is a view of like character showing the doors and gate open.

The drawings represent at 1 a portion of one of the floors of a building, the said floor having therein a hatchway which is protected by means of hatch-doors 2, 2, which are hinged at 3, 3, at opposite sides of the hatchway, as usual. The gate that is shown alongside the said hatchway comprises upper and lower bars 4 and 5, and slats 6, 6, extending vertically between the said bars 4 and 5, and connected pivotally at their ends with the said bars. The upper bar 4 is mounted pivotally at one end thereof upon a pivotal support constituted by a horizontal rail or bar 7 located at one side of the hatchway and having one end thereof attached to the corresponding guide-post 8 for the elevator car, the outer portion of the said bar 7 being sustained by a vertical post 9. The horizontal bar 7 serves as a railing at the side of the hatchway at which it is located. An eye or bearing in connection with the said upper bar 4 of the gate is fitted to the said bar 7 with capacity to turn thereon as the gate is swung vertically. The lower bar 5 of the gate has at one end thereof an eye or bearing fitting loosely a rockshaft 10 located alongside the hatchway and mounted in bearings in connection with a fixed stand 12 and with the upright post 9. The said rockshaft for the purposes of the invention is conveniently actuated in proper time-relation with the passage of the elevator-car through the hatchway, in its movements up and down. In the case of this embodiment of the invention, the rockshaft is furnished with an arm 13 adapted to project inwardly part way across the adjacent hatch-door, and also adapted for engagement therewith, as by means of a pad block 14 carried by the said arm and making contact with the wear-piece 15 attached to the hatchway-door. Through the interengagement between the wear-piece and the pad-block, the arm is moved upwardly and rockshaft 10 is correspondingly rocked as the hatch-door is opened; as the hatch-door closes, the arm is caused to swing downward and rockshaft 10 is reversely rocked, as through the engagement of a hook or clip 17 attached to the hatch-door. In practice, any other suitable or equivalent means of actuating the rockshaft 10 from the hatch-door may be employed.

Upon the rockshaft 10 is made fast a member 18 which herein is shown as a wheel, although the form thereof may be varied in practice, this member having a tooth which in this instance is provided by forming a notch 18ª in the periphery of the wheel. Upon the lower bar 5 of the gate is mounted a collar 21, upon which is pivoted at 22 a dog 23 having an engaging portion that is adapted to enter the recess of the wheel so as to engage with the said tooth.

In the closed position of the hatch-doors, the wheel 18 carried by the rockshaft 10 occupies a posititon with its notch or recess and tooth depressed as in the drawings. As the elevator-car in moving either up or down arrives at the floor in connection with which the gate is employed, and the hatch-doors are swung upward into open position, as by the automatic devices for that purpose which are employed in practice, the arm, rockshaft and wheel are turned so as to cause the notch or recess and tooth of the wheel to assume a higher position. When semi-automaticity in the working of the gate is desired, the collar 21 is fastened by means of its clamping screw 26 at a point upon bar 5 at such a distance from member 18 that normally the dog hangs in a position in which its engaging portion is clear of the tooth of the wheel, as in Fig. 1, so that the wheel may be turned without engagement of its tooth with the dog and consequently without imparting any movement to the gate. This permits opening movement of the hatch-doors to take place, as the elevator-car moves up or down, without causing any automatic change in the position of the gate. The opening of the gate, when desired to occur, is effected by hand, by swinging it upward. As the gate arrives in its highest position, the engaging portion of its dog enters the notch or recess of the wheel on the rockshaft and becomes engaged with the tooth of said wheel so that while the hatch-doors remain open, the gate also is locked in its upraised, open position. When the elevator-car leaves the floor and the hatch-doors are permitted or caused to close the reverse turning movement of the rockshaft and wheel permits the gate to swing down into closed position in unison with the closing of the hatch-doors.

In order to enable the gate to be rendered completely automatic, i. e., in order to provide for effecting the raising of the gate automatically when the hatch-doors are opened, I provide for retaining the engaging portion of the dog in the notch or recess of the wheel, and in engagement with the tooth, as by means of a pin 25 entered into a properly located hole in the collar to which the dog is pivoted. Or the collar may be adjusted along the lower bar 5 of the gate, by means of the clamping screw 26, so that the dog will be retained in adjustment with the notch or recess of the wheel.

The constructional features may be varied in practice. The gate may be provided with a foot 28 for supporting its lower portion above the floor, such foot being formed in this instance by the downward extension of one of the slats of the gate. The extremity of the upper bar 4 of the gate may rest, as shown, upon a support in connection with a fixed post 29. The said extremity of the bar 4 may enter, as shown in Fig. 1, a keeper in connection with the said post, or the keeper may be combined with the bar 30 which extends from the upper end of the post 29 and forms part of a railing connected with the guide-post 8ª at that side of the hatchway, said keeper serving to restrain the gate from being bent or swung toward or from the hatchway. Or one or both bars 4 and 5 may make contact by the extremities thereof with the fixed post 29, as in the case of the lower bar 5 in Fig. 1, to prevent the gate being sprung toward the hatchway.

The semi-automatic adjustment is preferred for use in connection with a floor or floors intermediate the top and bottom floors. It may be utilized in connection with the top floor also, but usually the semi-automatic adjustment will be used in connection with the intermediate floors, and the fully automatic with the top floor.

The illustrated construction permits the gate to be located nearer to or farther from the front side of the hatchway without other change than in the length of the rails or bars extending forward from the guide-posts 8, 8ª.

What is claimed as the invention is,—

1. Elevator-hatchway gate devices comprising, in combination with a rocker which is rocked as the elevator-car passes, and a vertically-movable hatchway-gate, coupling-means permitting the rocker to rock without raising the gate and adapted to couple the gate, when upraised, with the rocker so as to lower the gate automatically as the car moves away from the hatchway.

2. Elevator-hatchway gate devices comprising, in combination with a rocker which is rocked as the elevator-car passes, and a vertically-movable hatchway-gate, coupling means whereby said gate may be raised as well as lowered automatically by the rocker as the latter rocks, said coupling means adjustable to permit the gate to remain at rest while the rocker rocks idly during the rise of the car, and adapted to couple the gate, after being upraised by other means, with the rocker so as to lower the gate automatically as the car moves away from the hatchway.

3. In elevator-hatchway gate devices, the combination with a hatch-door which opens and closes as the elevator-car passes, a vertically-movable gate for the hatchway, and a rocker rocking in unison with the opening and closing of the hatch-door, of coupling means between the rocker and gate adapted to leave the gate in closed position as the hatch-door opens and further adapted to connect the upraised gate with the rocker so as to automatically lower the gate in unison with the closing of the hatch-door.

4. In elevator-hatchway gate devices, the combination with a hatch-door which opens and closes as the elevator-car passes, a vertically-movable gate for the hatchway, and a rocker rocking in unison with the opening and closing of the hatch-door, of coupling means whereby said gate may be raised as well as lowered automatically by the rocker as the latter rocks, said coupling means adjustable to permit the gate to remain at rest while the rocker rocks idly during the rise of the car, and adapted to couple the gate, after being upraised by other means, with the rocker so as to lower the gate automatically as the car moves away from the hatchway.

5. In elevator-hatchway gate devices, the combination with a hatch-door which opens and closes as the elevator-car passes, a vertically-movable gate for the hatchway, and a rocker rocked by the hatch-door, of coupling means between said rocker and gate, normally disconnected to permit the rocker to rock without controlling the gate, and adapted to connect them, as desired, so that the gate moves in unison with the said rocker.

6. In elevator-hatchway devices, the combination with a vertically-swinging gate for the hatchway, a horizontal rockshaft which is rocked as the elevator-car passes, and a member turning with said rockshaft, of means automatically engaging the gate, when upraised with said member so as to swing in unison with the downward turning of the rockshaft, said means adapted to be rendered idle at will.

In testimony whereof I affix my signature in presence of two witnesses.

MATHEW F. KEVLIN.

Witnesses:
  CHAS F. RANDALL,
  ELLEN O. SPRING.